United States Patent
Ma et al.

(10) Patent No.: US 7,621,211 B2
(45) Date of Patent: Nov. 24, 2009

(54) FORCE FEEDBACK POPPET VALVE HAVING AN INTEGRATED PRESSURE COMPENSATOR

(75) Inventors: Pengfel Ma, Naperville, IL (US);
Philippe Georges Vande Kerckhove, Naperville, IL (US)

(73) Assignees: Caterpillar Inc., Peoria, IL (US);
Caterpillar Japan Ltd (JP)

( * ) Notice: Subject to any disclaimer, the term of this patent is extended or adjusted under 35 U.S.C. 154(b) by 349 days.

(21) Appl. No.: 11/806,382

(22) Filed: May 31, 2007

(65) Prior Publication Data
US 2008/0295508 A1    Dec. 4, 2008

(51) Int. Cl.
*F16K 31/40*    (2006.01)
*F15B 11/00*    (2006.01)
(52) U.S. Cl. .................................. 91/446; 251/30.04
(58) Field of Classification Search ............ 91/446, 91/454; 60/452; 251/29, 30.01, 30.02, 30.04, 251/33
See application file for complete search history.

(56) References Cited

U.S. PATENT DOCUMENTS

| | | | |
|---|---|---|---|
| 3,366,202 A | 1/1968 | James | |
| 4,046,270 A | 9/1977 | Baron et al. | |
| 4,222,409 A | 9/1980 | Budzich | |
| 4,250,794 A | 2/1981 | Haak et al. | |
| 4,316,486 A | 2/1982 | Tandrup et al. | |
| 4,416,187 A | 11/1983 | Nystrom | |
| 4,437,385 A | 3/1984 | Kramer et al. | |

(Continued)

FOREIGN PATENT DOCUMENTS

GB    2 400 161    10/2004

JP    02613041 B2    5/1997
WO    WO 2007/149192    12/2007

OTHER PUBLICATIONS

U.S. Appl. No. 10/975,413, filed Oct. 29, 2004.

(Continued)

*Primary Examiner*—Thomas E Lazo
(74) *Attorney, Agent, or Firm*—Finnegan, Henderson, Farbow, Garrett & Dunner

(57) ABSTRACT

The force feedback poppet valve includes a valve body having a main chamber, a first port, and a second port. The force feedback poppet valve further includes a main poppet disposed within the main chamber and movable between an open position and a closed position to control fluid flow between the first port and the second port. The main poppet forms a control chamber within the main chamber. The force feedback poppet valve further includes a first passage communicating the control chamber with the second port, a second passage communicating the control chamber with the first port, and a pilot valve having a pilot poppet for controlling fluid flow between the control chamber and the first port through the second passage. The force feedback poppet valve further includes a pressure compensator disposed within the main poppet, and fluidly connected to the second port via the first passage. The force feedback poppet valve further includes a first spring coupled between the main poppet and the pilot poppet to provide a force proportional to a distance between the main poppet and the pilot poppet, and a second spring coupled between the pressure compensator and the pilot poppet to provide a force proportional to a distance between the pressure compensator and the pilot poppet.

20 Claims, 4 Drawing Sheets

U.S. PATENT DOCUMENTS

| | | | |
|---|---|---|---|
| 4,480,527 | A | 11/1984 | Lonnemo |
| 4,581,893 | A | 4/1986 | Lindbom |
| 4,586,330 | A | 5/1986 | Watanabe et al. |
| 4,623,118 | A | 11/1986 | Kumar |
| 4,662,601 | A | 5/1987 | Andersson |
| 4,706,932 | A | 11/1987 | Yoshida et al. |
| 4,711,267 | A | 12/1987 | Schwelm |
| 4,747,335 | A | 5/1988 | Budzich |
| 4,799,420 | A | 1/1989 | Budzich |
| 4,848,721 | A | 7/1989 | Chudakov |
| 4,942,900 | A | 7/1990 | Nozawa et al. |
| 5,137,254 | A | 8/1992 | Aardema et al. |
| 5,152,142 | A | 10/1992 | Budzich |
| 5,211,196 | A | 5/1993 | Schwelm |
| 5,287,794 | A | 2/1994 | Andersson |
| 5,297,381 | A | 3/1994 | Eich et al. |
| 5,313,873 | A | 5/1994 | Gall et al. |
| 5,350,152 | A | 9/1994 | Hutchison et al. |
| 5,366,202 | A | 11/1994 | Lunzman |
| 5,421,545 | A | 6/1995 | Schexnayder |
| 5,447,093 | A | 9/1995 | Budzich |
| 5,477,677 | A | 12/1995 | Krnavek |
| 5,537,818 | A | 7/1996 | Hosseini et al. |
| 5,553,452 | A | 9/1996 | Snow et al. |
| 5,568,759 | A | 10/1996 | Aardema |
| 5,678,470 | A | 10/1997 | Koehler et al. |
| 5,701,933 | A | 12/1997 | Lunzman |
| 5,709,368 | A | 1/1998 | Hajak, Jr. |
| 5,813,226 | A | 9/1998 | Krone |
| 5,813,309 | A | 9/1998 | Taka et al. |
| 5,857,330 | A | 1/1999 | Ishizaki et al. |
| 5,868,059 | A | 2/1999 | Smith |
| 5,878,647 | A | 3/1999 | Wilke et al. |
| 5,890,362 | A | 4/1999 | Wilke |
| 5,947,140 | A | 9/1999 | Aardema et al. |
| 5,960,695 | A | 10/1999 | Aardema et al. |
| 6,009,708 | A | 1/2000 | Miki et al. |
| 6,026,730 | A | 2/2000 | Yoshida et al. |
| 6,082,106 | A | 7/2000 | Hamamoto |
| 6,216,456 | B1 | 4/2001 | Mitchell |
| 6,367,365 | B1 | 4/2002 | Weickert et al. |
| 6,397,655 | B1 | 6/2002 | Stephenson |
| 6,467,264 | B1 | 10/2002 | Stephenson et al. |
| 6,502,393 | B1 | 1/2003 | Stephenson et al. |
| 6,502,500 | B2 | 1/2003 | Yoshino |
| 6,516,614 | B1 | 2/2003 | Knoll |
| 6,598,391 | B2 | 7/2003 | Lunzman et al. |
| 6,619,183 | B2 | 9/2003 | Yoshino |
| 6,655,136 | B2 | 12/2003 | Holt et al. |
| 6,662,705 | B2 | 12/2003 | Huang et al. |
| 6,691,603 | B2 | 2/2004 | Linerode et al. |
| 6,694,860 | B2 | 2/2004 | Yoshino |
| 6,715,402 | B2 | 4/2004 | Pfaff et al. |
| 6,718,759 | B1 | 4/2004 | Tabor |
| 6,725,131 | B2 | 4/2004 | Lunzman |
| 6,732,512 | B2 | 5/2004 | Pfaff et al. |
| 6,748,738 | B2 | 6/2004 | Smith |
| 6,761,029 | B2 | 7/2004 | Linerode |
| 6,869,060 | B2 * | 3/2005 | Barber et al. ............ 251/30.02 |
| 7,204,185 | B2 | 4/2007 | Ma et al. |
| 2003/0121256 | A1 | 7/2003 | Mather |
| 2003/0121409 | A1 | 7/2003 | Lunzman et al. |
| 2003/0125840 | A1 | 7/2003 | Lunzman et al. |
| 2003/0196545 | A1 | 10/2003 | Jensen et al. |
| 2004/0055288 | A1 | 3/2004 | Pfaff et al. |
| 2004/0055289 | A1 | 3/2004 | Pfaff et al. |
| 2004/0055452 | A1 | 3/2004 | Tabor |
| 2004/0055453 | A1 | 3/2004 | Tabor |
| 2004/0055454 | A1 | 3/2004 | Pfaff et al. |
| 2004/0055455 | A1 | 3/2004 | Tabor et al. |
| 2006/0090460 | A1 | 5/2006 | Ma et al. |
| 2006/0243129 | A1 | 11/2006 | Ma et al. |
| 2007/0056439 | A1 | 3/2007 | Vonderwell |

OTHER PUBLICATIONS

U.S. Appl. No. 11/453,904, filed Jun. 16, 2006.
U.S. Appl. No. 11/454,500, filed Jun. 16, 2006.

* cited by examiner

FORCE FEEDBACK POPPET VALVE HAVING AN INTEGRATED PRESSURE COMPENSATOR

TECHNICAL FIELD

The present disclosure relates generally to a force feedback poppet valve, and more particularly, to a force feedback poppet valve having an integrated pressure compensator.

BACKGROUND

Machines such as, for example, dozers, loaders, excavators, motor graders, and other types of heavy machinery use one or more hydraulic actuators to accomplish a variety of tasks. These actuators are fluidly connected to a pump on the machine that provides pressurized fluid to chambers within the actuators. An electro-hydraulic valve arrangement is typically fluidly connected between the pump and the actuators to control a flow rate and direction of pressurized fluid to and from the chambers of the actuators.

Machine hydraulic circuits that fluidly connect multiple actuators to a common pump may experience undesirable pressure fluctuations within the circuits during operation of the actuators. In particular, the pressure of a fluid supplied to one actuator may undesirably fluctuate in response to operation of a different actuator fluidly connected to the same hydraulic circuit. These pressure fluctuations may cause inconsistent and/or unexpected actuator movements. In addition, the pressure fluctuations may be severe enough and/or occur often enough to cause malfunction or premature failure of hydraulic circuit components.

One method of compensating for these pressure fluctuations within the fluid supplied to a hydraulic actuator is described in U.S. Pat. No. 5,878,647 (the '647 patent) issued to Wilke et al. on Mar. 9, 1999. The '647 patent describes a hydraulic circuit having two pairs of solenoid valves, a variable displacement pump, a reservoir tank, and a hydraulic actuator. One pair of the solenoid valves includes a head-end supply valve and a head-end return valve that connects a head end of the hydraulic actuator to either the variable displacement pump or the reservoir tank. The other pair of solenoid valves includes a rod-end supply valve and a rod-end return valve that connects a rod end of the hydraulic actuator to either the variable displacement pump or the reservoir tank. Each of these four solenoid valves is associated with a different pressure compensating check valve. Each pressure compensating check valve is connected between the associated solenoid valve and the actuator to control fluctuations in pressure of the fluid between the associated valve and the actuator.

Although the multiple pressure compensating valves of the hydraulic circuit described in the '647 patent may reduce the effect of pressure fluctuations within the hydraulic circuit, because of their number they may increase the cost and complexity of the hydraulic circuit. In addition, the pressure compensating valves of the '647 patent may not control the pressures within the hydraulic circuit precisely enough for optimal performance of the associated actuator.

The disclosed force feedback poppet valve is directed to overcoming one or more of the problems set forth above.

SUMMARY OF THE INVENTION

In one aspect, the present disclosure is directed to a force feedback poppet valve having an integrated pressure compensator. The force feedback poppet valve includes a valve body having a main chamber, a first port, and a second port. The force feedback poppet valve further includes a main poppet disposed within the main chamber and movable between an open position and a closed position to control fluid flow between the first port and the second port. The main poppet forms a control chamber within the main chamber. The force feedback poppet valve further includes a first passage communicating the control chamber with the second port, a second passage communicating the control chamber with the first port, and a pilot valve having a pilot poppet for controlling fluid flow between the control chamber and the first port through the second passage. The force feedback poppet valve further includes a pressure compensator disposed within the main poppet, and fluidly connected to the second port via the first passage. The force feedback poppet valve further includes a first spring coupled between the main poppet and the pilot poppet to provide a force proportional to a distance between the main poppet and the pilot poppet, and a second spring coupled between the pressure compensator and the pilot poppet to provide a force proportional to a distance between the pressure compensator and the pilot poppet.

In another aspect, the present disclosure is directed to another force feedback poppet valve having an integrated pressure compensator. The force feedback poppet valve includes a valve body including a main chamber having a first port and a second port. The force feedback poppet valve further includes a main poppet disposed within the main chamber and forming a control chamber within the main chamber. The force feedback poppet valve further includes a first passage communicating the control chamber with the second port and a second passage communicating the control chamber with the first port. The force feedback poppet valve further includes a third passage communicating the control chamber with the first port and a fourth chamber communicating the control chamber with the second port. The force feedback poppet valve further includes a pilot valve having a pilot poppet for controlling fluid flow between the control chamber and the first port through the second passage and between the control chamber and the second port through the fourth passage. The force feedback poppet valve further includes a first spring coupled between the main poppet and the pilot poppet to provide a force proportional to a distance between the main poppet and the pilot poppet and a second spring coupled between the pressure compensator and the pilot poppet to provide a force proportional to a distance between the pressure compensator and the pilot poppet. The force feedback poppet valve further includes a pressure compensator disposed within the main poppet, and fluidly connected to the second port via the first passage and to the first port via the third passage, and

DETAILED DESCRIPTION

Figure 1:
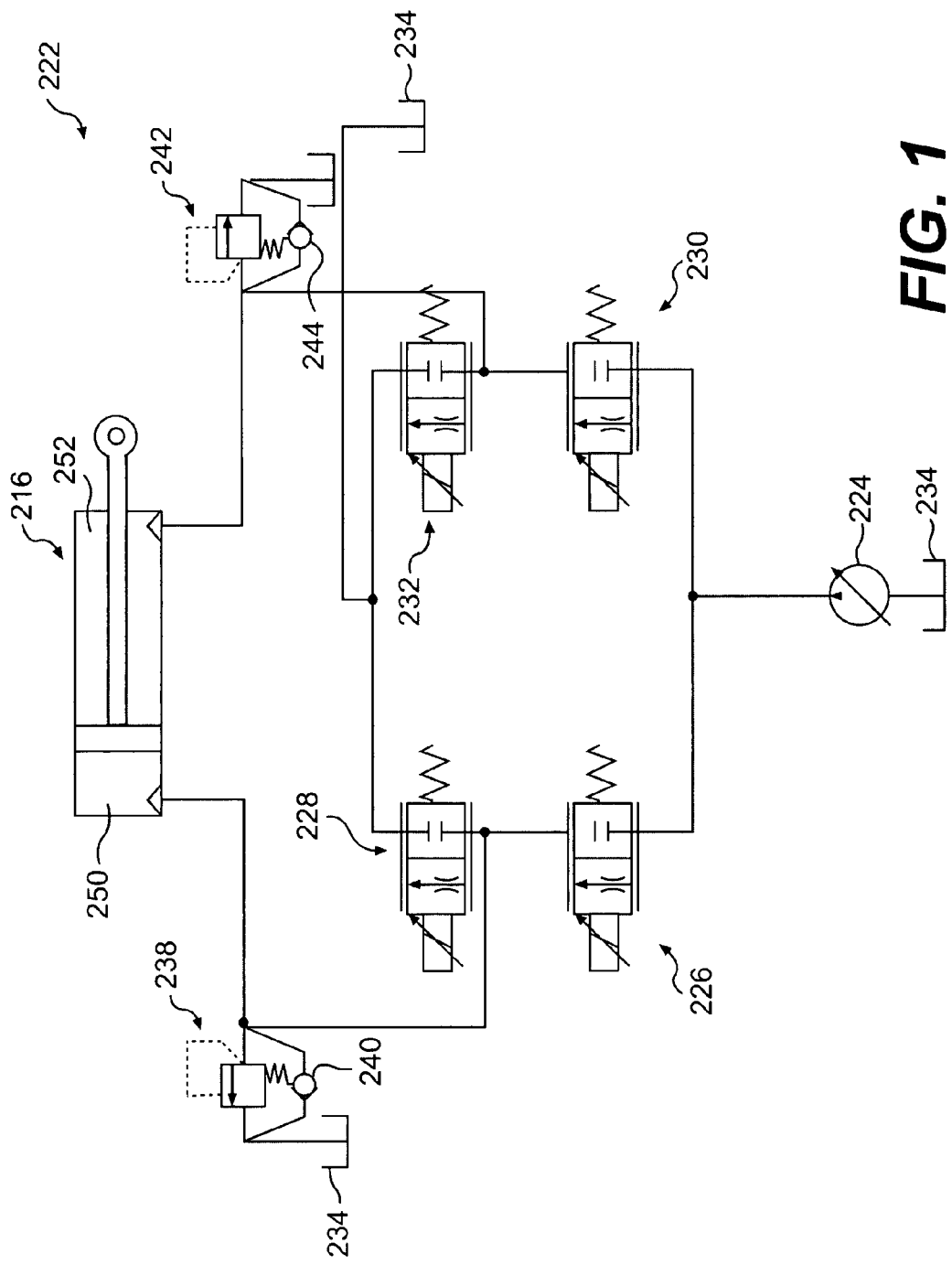
FIG. 1 is a schematic illustration of an exemplary disclosed hydraulic circuit.

FIG. 1 illustrates a hydraulic system 222 having a hydraulic actuator 216 movable to control a work implement (not shown). Hydraulic actuator 216 may include a head-end chamber 250 and a rod-end chamber 252. Hydraulic system 222 may further include a source 224 of pressurized fluid directed to move the actuator by way of a head-end supply valve 226, a head-end drain valve 228, a rod-end supply valve 230, and a rod-end drain valve 232. Hydraulic system 222 may also include a tank 234, a head-end pressure relief valve 238, a head-end makeup valve 240, a rod-end pressure relief valve 242, and a rod-end makeup valve 244 that cooperate to maintain desired pressures within hydraulic system 222. It is contemplated that hydraulic system 222 may include additional and/or different components such as, for example, a pressure sensor, a temperature sensor, a position sensor, a controller, an accumulator, and other components known in the art.

Source 224 may produce a flow of pressurized fluid and include a pump such as, for example, a variable displacement pump, a fixed displacement pump, or any other source of pressurized fluid known in the art. Source 224 may be drivably connected to a power source (not shown) such as an engine by, for example, a countershaft (not shown), a belt (not shown), an electrical circuit (not shown), or in any other suitable manner. Source 224 may be dedicated to supplying pressurized fluid only to hydraulic system 222, or alternately may supply pressurized fluid to additional hydraulic systems.

Figure 2:
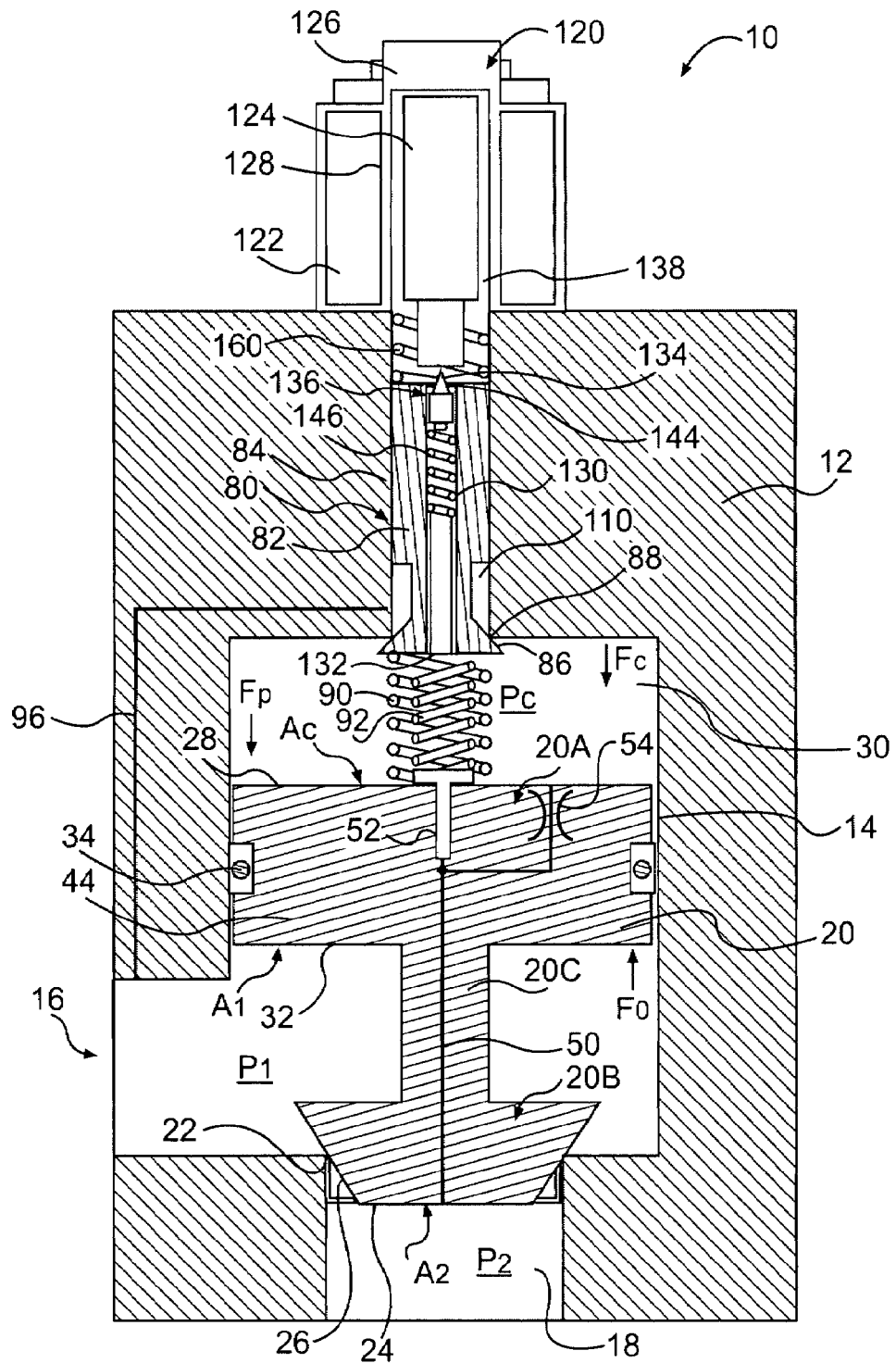
FIG. 2 is a cross-sectional view of an exemplary force feedback poppet valve according to one embodiment of the disclosure.

Head-end and rod-end drain valves 228 and 232 may be disposed between hydraulic actuator 216 and tank 234 to regulate a flow of pressurized fluid from hydraulic actuator 216 to tank 234. Head-end and rod-end supply valves 226 and 230 may be disposed between source 224 and hydraulic actuator 216 to regulate a flow of pressurized fluid from source 224 to hydraulic actuator 216. FIG. 2 illustrates an exemplary force feedback poppet valve 10 that may be utilized as any of head-end and/or rod-end supply and/or drain valve 226-232. Force feedback poppet valve 10 may include a valve body 12, a main poppet 20, and an actuator 120.

Valve body 12 may have a main chamber 14. Main chamber 14 may include a first port 16 at a side wall of main chamber 14 and a second port 18 at a bottom of main chamber 14. When force feedback poppet valve 10 is incorporated into head-end or rod-end supply valve 226 or 230, first port 16 may be in communication with hydraulic actuator 216, while second port 18 may be in communication with source 24. Alternatively, when force feedback poppet valve 10 is incorporated into head-end or rod-end drain valves 228 or 232, first port 16 may be in communication with tank 234, while second port 18 may be in communication with hydraulic actuator 216.

Main poppet 20 may be slidably disposed within the main chamber 14 and movable to selectively communicate first port 16 with second port 18 (i.e. selectively communicating source 24 with hydraulic actuator 216 or hydraulic actuator 216 with tank 234). Main poppet 20 may include a first end portion 20A, a second end portion 20B, and a central portion 20C connecting first end portion 20A with second end portion 20B.

First end portion 20A of main poppet 20 may include an upper surface 28, which forms a control chamber 30 with inner walls of main chamber 14. Upper surface 28 may have an effective surface area value Ac exposed to fluid within control chamber 30. First end portion 20A of main poppet 20 may also include a lower surface 32 in contact with fluid received through first port 16. Main poppet 20 may further include a sealing ring 34 mounted on sidewalls of main poppet 20 to prevent fluid from leaking between control chamber 30 and first port 16 along the sidewalls of main poppet 20.

Second end portion 20B may include an end surface 24 and a seating surface 26. Seating surface 26, may be substantially conical, as shown in FIG. 2, or any other appropriate shape. The area of end surface 24 and the area of seating surface 26 exposed to fluid within second port 18 may have an effective surface area value A2. An effective surface area A1 on lower surface 32 may be defined by A1=Ac−A2. In one embodiment, effective surface area A1 may be substantially equal to effective surface area A2, and surface area Ac of upper surface 28 of main poppet 20 may equal effective surface area A1 plus effective surface area A2 (Ac=A1+A2=2A1=2A2). The seating surface 26 may be adapted to sealingly engage a valve seat 22 of second port 18 when main poppet 20 is in a closed position, and thus may block fluid communication between first port 16 and second port 18. When seating surface 26 is moved away from valve seat 22, fluid may flow between first port 16 and second port 18.

A first passage 50 formed within main poppet 20 may extend from second port 18 to control chamber 30. First passage 50 may include a meter-in orifice 54 for restricting flow of the fluid in first passage 50. Orifice 54 may be a variable orifice or a fixed orifice. The variable orifice may change its opening area as a function of differential pressure across the orifice, which may allow control of the meter-in flow to control chamber 30 when main poppet 20 is in an open position. The opening area of the orifice may be larger at low pressure differential, which allows main poppet 20 to be responsive in the closing direction at low pressure differential. In another embodiment, the variable orifice may be a flow regulator. The flow regulator may maintain the meter-in flow substantially constant, and thus maintain a substantially constant speed of the main poppet 20. Main poppet 20 may further include an internal compensator 52 disposed within first passage 50 to resolve pressure signals from second port 18 to maintain a predetermined pressure differential between first port 16 and second port 18. Internal compensator 52 may be disposed within main poppet 20 to sense a pressure difference between second port 18 and control chamber 30, and exert a force against a pilot poppet 82 through a compensator spring 92. Internal compensator 52 may form a seal between first passage 50 and control chamber 30, allowing fluid to only flow via meter-in orifice 54 when internal compensator 52 is fully engaged with main poppet 20. As the pressure differential between first passage 50 and control chamber 30 increases, internal compensator may be biased toward control chamber 30 and partially out of main poppet 20

Force feedback poppet valve 10 may further include a pilot valve 80. Pilot valve 80 may include the pilot poppet 82 slidably disposed in a bore 84 defined within pilot valve 80. Pilot poppet 82 may include a valve seating portion 86 at a lower end thereof. A valve seat 88 may be formed at a lower end of bore 84 for receiving valve seating portion 86 of pilot poppet 82. Valve seating portion 86 may sealingly engage valve seat 88. A compression feedback spring 90 may be coupled between main poppet 20 and pilot poppet 82. Further, compensator spring 92 may be disposed within compression feedback spring 90 and may be coupled between internal compensator 52 and pilot poppet 82.

Pilot poppet 82 may define an annular chamber 110 on side walls of bore 84. A passage 96 formed within valve body 12 may extend from first port 16 to annular chamber 110 to fluidly connect annular chamber 110 with first port 16. When pilot poppet 82 is in a closed position (i.e., valve seating portion 86 of pilot poppet 82 is sealingly engaged with valve seat 88), fluid communication between control chamber 30 and annular chamber 110 may be blocked. When pilot poppet 82 is in an open position, annular chamber 110 may be in fluid communication with control chamber 30.

Actuator 120 may control the motion of pilot valve 80. In one embodiment, actuator 120 may be a solenoid-type actuator including an electromagnetic coil 122 and an armature 124. Electromagnetic coil 122 may be located around and secured to a cartridge or housing 126. Armature 124 may be positioned within a tube 128 defined within cartridge 126 and adapted to exert a downward force to move pilot poppet 82 toward the open position when electric current is applied to electromagnetic coil 122. Armature 124 may force pilot poppet 82 to move toward main poppet 20, resulting in movement of pilot poppet 82 away from valve seat 88, thereby opening fluid communication between control chamber 30 and annular chamber 110. When actuator 120 is deactivated, feedback spring 90 and compensator spring 92 may bias pilot poppet 82 toward valve seat 88, thereby closing off the bottom end of bore 84. In this situation, there may be substantially no fluid flow between annular chamber 110 and control chamber 30. Force feedback poppet valve 10 may further include a stabilizer spring 160 coupled to an upper end of pilot poppet 82 to bias the force applied by feedback spring 90 to pilot poppet 82.

Force feedback poppet valve 10 may include an armature chamber 138 at the upper end of pilot poppet 82. Pilot poppet 82 may include a pilot passage 130 having a first opening 132 at one end that is connected to control chamber 30, and a second opening 134 at the other end that is connected to armature chamber 138. Force feedback poppet valve 10 may further include a needle valve 136 adapted to selectively open second opening 134 of pilot passage 130 when needle valve 136 is pushed down by armature 124.

Figure 3:
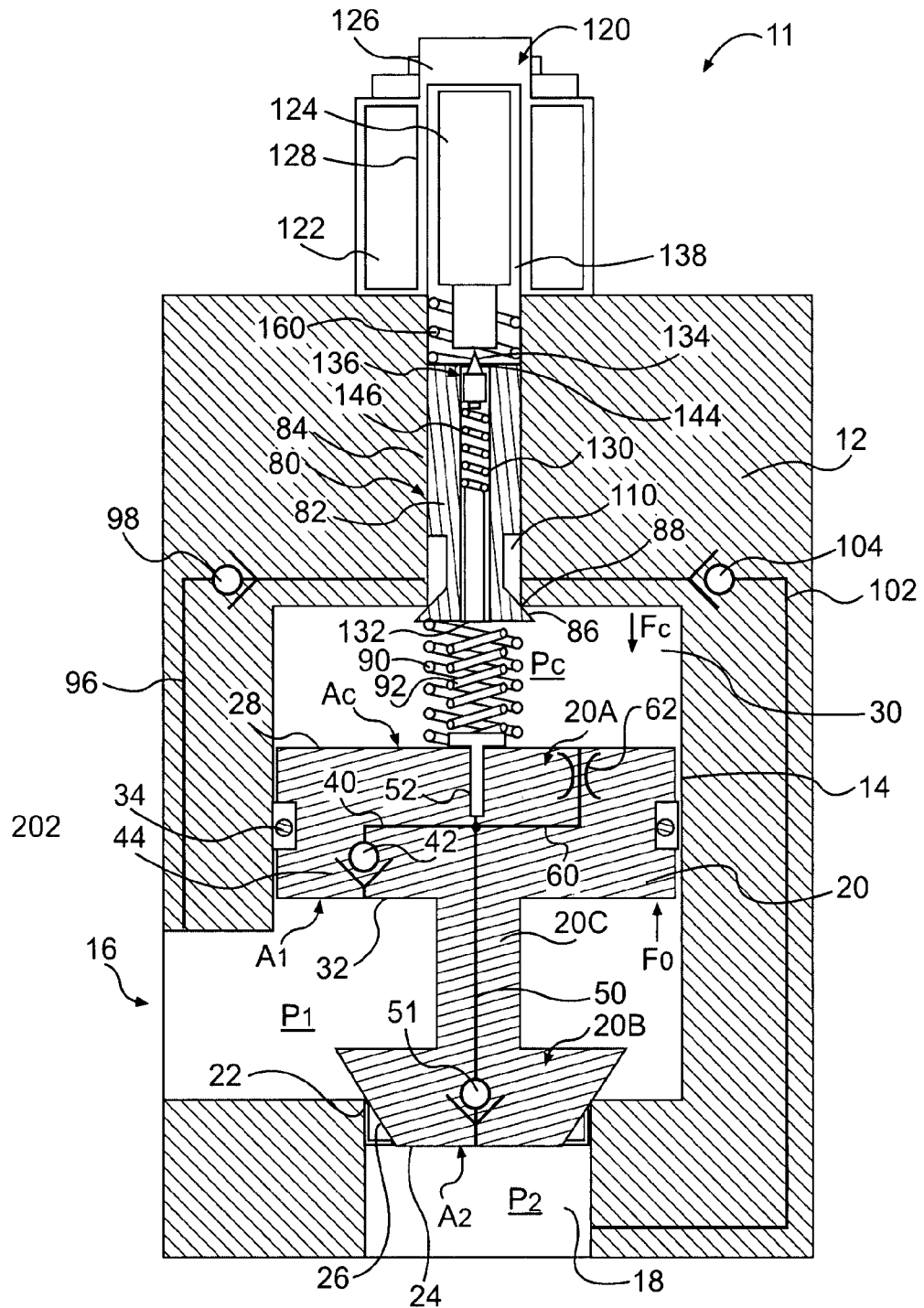
FIG. 3 is a cross-sectional view of an exemplary force feedback poppet valve according to another embodiment of the disclosure.

In one alternative embodiment, as shown in FIG. 3, main poppet 20 may further include a passage 40 extending from first port 16 to a common passage 60. Passage 40 may include a check valve 42 allowing fluid to flow from first port 16 only to control chamber 30. Further, passage 50 may include a check valve 51 allowing fluid to flow from second port 18 only to control chamber 30. Passages 50 and 40 may be connected to control chamber 30 through common passage 60. Common passage 60 may have a common meter-in orifice 62.

Passage 96 may include a check valve 98, which may allow fluid to flow from annular chamber 110 only to first port 16. Further, a passage 102 may be formed in valve body 12 and may extend from second port 18 to annular chamber 110. Passage 102 may also include a check valve 104 which may allow fluid to flow from annular chamber 110 only to second port 18.

Common meter-in orifice 62 may be a fixed orifice or a variable orifice. The variable orifice may change its opening area as a function of differential pressure across the orifice, which may allow control of the meter-in flow to control chamber 30 when main poppet 20 is in an open position. The opening area of the orifice may be larger at low pressure differential, which allows main poppet 20 to be responsive in the closing direction at low pressure differential. In another embodiment, the variable orifice may be a flow regulator. The flow regulator may maintain the meter-in flow substantially constant, and thus maintain a substantially constant speed of the main poppet 20.

In the embodiment shown in FIG. 3, internal compensator 52 may be disposed within main poppet 20 to sense a pressure difference between control chamber 30 and the one of first port 16 and second port 18 having a higher pressure. Internal compensator 52 may exert a force against pilot poppet 82 through compensator spring 92.

Figure 4:
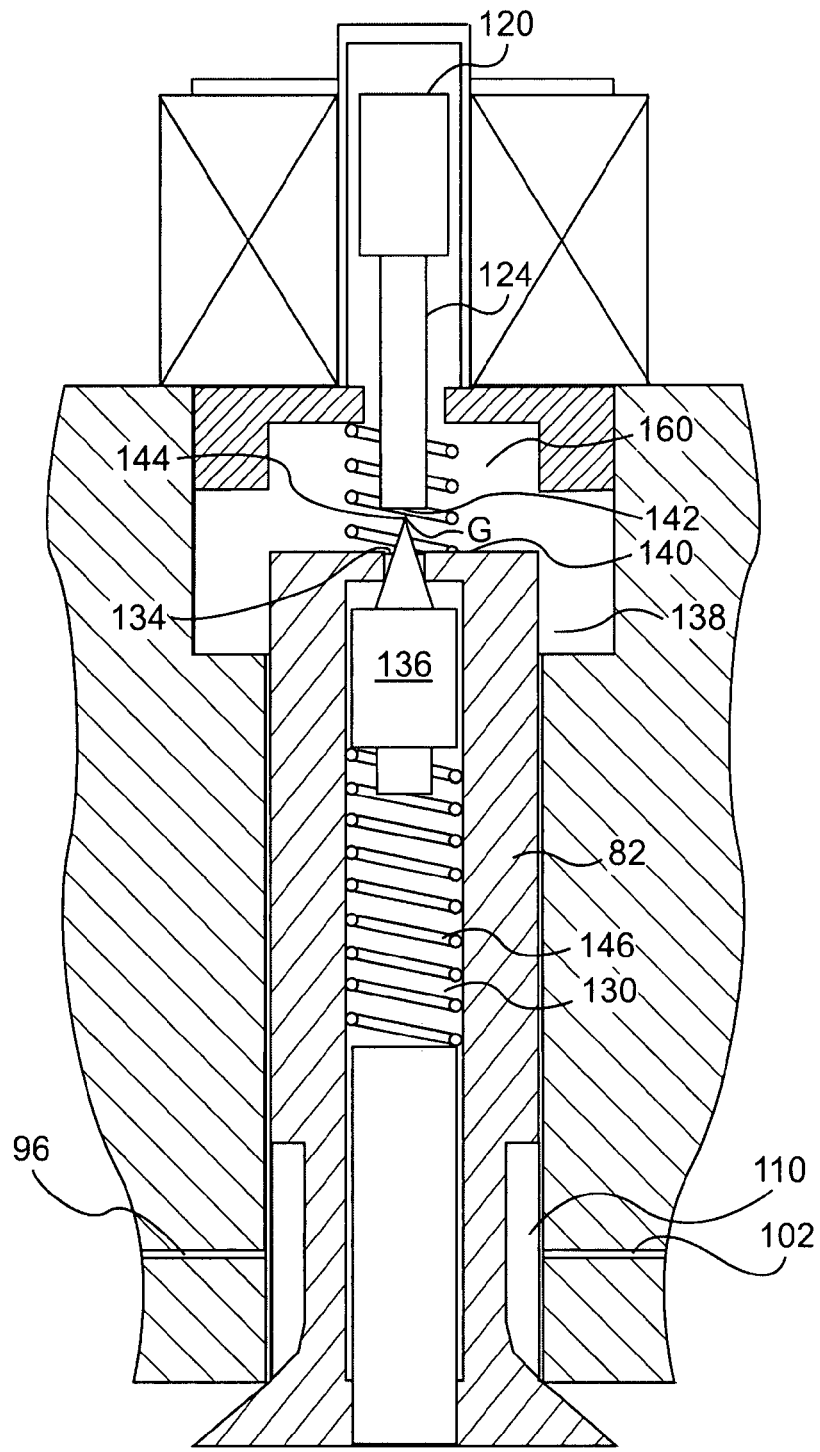
FIG. 4 is a cross-sectional view of an exemplary needle valve according to one embodiment of the disclosure.

FIG. 4 shows an enlarged view of needle valve 136. As shown in FIG. 4, when actuator 120 is deactivated and armature 124 is in a released position, there may be a gap G between an upper surface 140 of pilot poppet 82 and a bottom surface 142 of armature 124. Upper surface 140 of pilot poppet 82 may include the second opening 134 fluidly connecting passage 130 to armature chamber 138. A leak path may exist from control chamber 30 to armature chamber 138 through pilot passage 130, and from armature chamber 138 to annular chamber 110 along sidewalls of pilot poppet 82. Needle valve 136 may include a conical tip 144 to selectively open and close second opening 134 of pilot passage 130. Conical tip 144 may be attached on a resilient member 146 such as a coil spring or a leaf spring to bias conical tip 144 against aperture 134 to seal aperture 134. When in a closed position, conical tip 144 may extend through aperture 134 to a point above upper surface 140 of pilot poppet 82, and may seal aperture 134 to prevent undesired leakage along the leak path.

When a current is applied to electromagnetic coil 122, armature 124 may be forced down to move conical tip 144 downward through second opening 134, so that fluid can flow from control chamber 30 through passage 130 out of second opening 134 to armature chamber 138, which may result in the pressure acting on the upper end of pilot poppet 82 being substantially equal to the pressure on the lower end of pilot poppet 82. By having an equalized pressure on the upper end and the lower end of pilot poppet 82, only a small force may be needed to open pilot valve 80. When the electrical current in coil 122 increases, the armature 124 moves down to push pilot poppet 82 toward main poppet 20 to open pilot valve 80 to allow more of the fluid to flow from control chamber 30 to annular chamber 110, then through annular chamber 110 to passages 96 and 102.

In another embodiment, aperture 134 may be relatively large, and may still allow opening against maximum system pressure, but may require a special opening current strategy to enable gradual opening of pilot poppet 82. The current may need to be reduced right after opening needle valve 136 to use the full opening modulation range of pilot poppet 82.

INDUSTRIAL APPLICABILITY

The disclosed force feedback poppet valve with an internal pressure compensator may be applicable to any fluid actuator where precise control of pressures and/or flows of fluid associated with the actuator is desired. The disclosed valve may provide high-response pressure regulation that results in consistent, predictable actuator performance in a low-cost, simple configuration. The operation of force feedback poppet valves 10, 11 will now be explained.

The normal use of force feedback poppet valves 10, 11 is to control fluid flow between first port 16 and second port 18 and to regulate a pressure differential between the two ports with internal compensator 52 such that a constant flow between the two ports is maintained. One example of such usage, as shown in FIG. 1, is having one of first port 16 and second port 18 connected to pump 224, and the other port connected to hydraulic actuator 216. Another example would be to have one of first port 16 and second port 18 connected to hydraulic actuator 216, and the other port connected to tank 234.

Main poppet 20 may be continuously urged in a valve opening direction toward pilot valve 80 by the pressurized fluid in first port 16 having a fluid pressure P1 acting on surface 32, which is exposed to the fluid in first port 16, and the pressurized fluid in second port 18 having a fluid pressure P2 acting on the surfaces 24 and 26, which are exposed to the fluid in second port 18. The fluid in control chamber 30 may have a pressure Pc acting on upper surface 28. As described above, the upper surface 28 of main poppet 20 exposed to the fluid in control chamber 30 may have an effective surface area Ac. The area of end surface 24 and the area of seating surface 26 exposed to the fluid in second port 18 may have an effective surface area value A2. An effective surface area A1 on lower surface 32 may be defined by A1=Ac−A2.

In an equilibrium condition, a valve opening force Fo applied in an upward direction on main poppet 20 may equal a valve closing force Fc applied in a downward direction on main poppet 20. Valve closing force Fc may equal a force applied to upper surface 28 by fluid pressure Pc in control chamber 30 combined with a force applied by feedback spring 90 and compensator spring 92. Valve opening force Fo may be equal to a force applied to effective surface area A1 by fluid pressure P1 in first port 16 plus a force applied to effective surface area A2 by fluid pressure P2 in second port 18.

Fluid communication between first port 16 and second port 18 may be initiated by applying an electric current to coil 122 of actuator 120 to move armature 124 downward, so that a control force is exerted against conical tip 144 of needle valve 136 in a downward or valve opening direction. Downward movement of armature 124 may initially open needle valve 136 and allow some small amount of fluid to flow from control chamber 30 to armature chamber 138 through passage 130 to equalize the pressure on the upper end and the lower end of pilot poppet 82. As the electrical current in coil 122 of actuator 120 increases, armature 124 may apply a control force to move pilot poppet 82 toward main poppet 20 to open pilot poppet 82 and subsequently to allow more fluid to flow from control chamber 30 to annular chamber 110. The fluid may then flow from annular chamber 110 to first port 16 or second port 18, whichever has a lower pressure.

FIG. 2 may represent a unidirectional poppet valve, in which pressure P2 in second port 18 is greater than pressure P1 in first port 16, pressure Pc in control chamber 30 may be lower than pressure P2 in second port 18 and greater than pressure P1 in first port 16, and fluid may flow from second port 18 to control chamber 30 through first passage 50. The diameter of meter-in orifice 54 in first passage 50 may be predetermined to provide a desired response time of main poppet 20.

When the combined upward force acting on main poppet 20 by pressure in first port 16 and pressure in second port 18 is greater than the combined downward force acting on main poppet 20 by pressure in control chamber 30, feedback spring 90, and compensator spring 92, main poppet 20 may be forced upwardly in a valve opening direction to initially move seating surface 26 away from valve seat 22 and subsequently establish fluid communication between first port 16 and second port 18. The upward movement of main poppet 20 in the valve opening direction may compress feedback spring 90 and compensator spring 92, which exert a feedback force against pilot poppet 82 to counteract the control force caused by the electric current in coil 122. Feedback spring 90 and compensator spring 92 also apply a force against upper surface 28 of main poppet 20, which may be equal to the feedback force exerted against pilot poppet 82. During upward movement of main poppet 20 and internal compensator 52, compression of feedback spring 90 and compensator spring 92 may increase until pilot poppet 82 is balanced.

The feedback force applied by feedback spring 90 and compensator spring 92 on pilot poppet 82 may continue to increase during the upward movement of main poppet 20 and internal compensator 52. When pilot poppet 82 reaches an equilibrium condition, the feedback force equals the control force on pilot poppet 82. In this situation, the displacement of main poppet 20 may be proportional to the level of control force exerted on pilot valve 80 by armature 124. Such displacement of main poppet 20 and the degree of opening of the valve controlled by main poppet 20 may be varied by controlling electrical current applied to actuator 120. A new position of main poppet 20 may be obtained by increasing or decreasing electrical current applied to solenoid coil 122. Complete removal of the electrical current may result in pilot poppet 82 moving to a closed position. When fluid pressure in first port 16 decreases, the combined upward force acting on main poppet 20 by the pressure in first port 16 and the pressure in second port 18 may be smaller than the combined downward force acting on main poppet 20 by the pressure in control chamber 30, feedback spring 90, and compensator spring 92, and main poppet 20 may be moved back to a closed position, thereby blocking the fluid communication between first port 16 and second port 18.

Internal compensator 52 may compensate for sudden pressure changes to maintain a substantially constant flow rate. For example, if the pressure in second port 18 increases suddenly, feedback spring 90 and pilot poppet 82 may not, on their own, be able to respond in a quick enough manner to compensate for the increased pressure, and the flow through valve 10 may greatly increase for a short period of time. With internal compensator 52, however, valve 10 may be able to quickly react to sudden pressure spikes to greatly reduce flow variances.

If the pressure differential P2−Pc suddenly increases, as might happen if P2 increases and Pc remains constant, internal compensator 52 may be urged away from main poppet 20 to balance hydraulic forces acting on it from second port 18 and hydraulic forces and spring force acting on it from control chamber 30. For example, as increased pressure P2 forces internal compensator 52 away from main poppet 20 and towards pilot poppet 82, internal compensator 52 may compress compensator spring 92 to apply an increased spring force to pilot poppet 82. To compensate for this increased spring force, pilot poppet 82 may be pushed towards a closed position. Control chamber pressure Pc may increase, causing main poppet 20 to move toward a flow blocking position to equalize hydraulic and spring forces. This movement of main poppet 20 may relax the spring forces generated by feedback spring 90, causing pilot poppet 82 to once again move toward an open position to regain force balance with main poppet 20.

FIG. 3 may represent a bidirectional force feedback poppet valve 11, in which fluid may flow either from second port 18 to first port 16, as discussed above, or from first port 16 to second port 18. In a situation that pressure P1 in first port 16 is greater than pressure P2 in second port 18, a similar process may occur except that the fluid may flow in a reversed direction. In this situation, the fluid in control chamber 30 may flow to second port 18, and fluid pressure Pc in control chamber 30 may be reduced. As previously described, reducing fluid pressure Pc in control chamber 30 may reduce the valve closing force Fc exerted on main poppet 20 and eventually the valve opening force Fo becomes greater than the valve closing force Fc, thereby causing main poppet 20 to move upwardly to open fluid communication between first port 16 and second port 18.

Internal compensator 52 may compensate for sudden pressure changes to maintain a substantially constant flow rate. For example, if the pressure in first port 16 or second port 18, which ever has the higher pressure, increases suddenly, feedback spring 90 and pilot poppet 82 may not, on their own, be able to respond in a quick enough manner to compensate for the increased pressure, and the flow through valve 11 may greatly increase for a short period of time. With internal compensator 52, however, valve 11 may be able to quickly react to sudden pressure spikes to greatly reduce flow variances.

If the pressure differential between the inlet (one of first port 16 and second port 18 having a higher pressure) and control chamber 30 suddenly increases, internal compensator 52 may be urged away from main poppet 20 toward pilot poppet 82 to balance hydraulic forces acting on it from second port 18 and hydraulic forces and spring forces acting on it from control chamber 30, feedback spring 90, and compensator spring 92. For example, an increased pressure P1 in first port 16 may force internal compensator 52 away from main poppet 20 and compress compensator spring 52 to apply an increased spring force to pilot poppet 82. To compensate for this increased spring force, pilot poppet 82 may be pushed toward a closed position, restricting the flow of fluid from control chamber 30 through third and/or fourth passages 98, 102. This flow restriction may increase control chamber 30 pressure Pc, causing main poppet 20 to move toward a flow blocking position to equalize the hydraulic and spring forces. This movement of main poppet 20 may relax the spring forces generated by feedback spring 90, causing pilot poppet 82 to once again move toward an open position to regain force balance with main poppet 20.

The disclosed valve system provides a force feedback valve and may allow bidirectional controls of the force feedback valve while simultaneously providing an integrated pressure compensation system to reduce pressure and flow variances. Moreover, the disclosed valve system provides a mechanism allowing the use of small electrical current to control the opening of the force feedback valve. This may allow the system to utilize smaller solenoid actuators and may decrease the operational and maintenance costs. The disclosed valve system also provides a mechanism for monitoring and controlling the degree of opening of the force feedback valve. Further, because the pressure compensator may be integrated within the valve, the disclosed hydraulic system may require reduced space and hardware.

It will be apparent to those skilled in the art that various modifications and variations can be made to the force feedback poppet valve. Other embodiments will be apparent to those skilled in the art from consideration of the specification and practice of the disclosed force feedback poppet valve. It is intended that the specification and examples be considered as exemplary only, with a true scope being indicated by the following claims and their equivalents.

What is claimed is:

1. A valve comprising:
   a valve body including a main chamber having a first port and a second port;
   a main poppet disposed within the main chamber and being movable between an open position and a closed position to control fluid flow between the first port and the second port, the main poppet forming a control chamber within the main chamber;
   a first passage communicating the control chamber with the second port;
   a second passage communicating the control chamber with the first port;
   a pilot valve having a pilot poppet for controlling fluid flow between the control chamber and the first port through the second passage;
   a first spring coupled between the main poppet and the pilot poppet to provide a force proportional to a distance between the main poppet and the pilot poppet;
   a pressure compensator disposed at least partially within the main poppet, and fluidly connected to the second port via the first passage, and
   a second spring coupled between the pressure compensator and the pilot poppet to provide a force proportional to a distance between the pressure compensator and the pilot poppet.

2. The valve of claim 1, wherein the first passage includes an orifice to restrict the flow of the fluid from the second port to the control chamber.

3. The valve of claim 2, wherein the orifice is a variable orifice adapted to regulate fluid flow rate through the first passage to the control chamber in response to a pressure differential across the orifice.

4. The valve of claim 3, wherein the variable orifice includes a flow regulator to maintain a substantially constant fluid flow rate through the first passage to the control chamber.

5. The valve of claim 1, wherein the pilot poppet includes a pilot passage fluidly communicating the control chamber with an armature chamber.

6. The valve of claim 5, further including a needle valve adapted to selectively open and close the pilot passage.

7. The valve of claim 1, wherein the main poppet includes a frustaconical tip adapted to selectively control fluid flow between the first port and second port.

8. A valve comprising:
   a valve body including a main chamber having a first port and a second port;
   a main poppet disposed within the main chamber and being movable between an open position and a closed position to control fluid flow between the first port and the second port, the main poppet forming a control chamber within the main chamber;
   a first passage communicating the control chamber with the second port;
   a second passage communicating the control chamber with the first port;
   a third passage communicating the control chamber with the first port;
   a fourth chamber communicating the control chamber with the second port;
   a pilot valve having a pilot poppet for controlling fluid flow between the control chamber and the first port through the second passage and between the control chamber and the second port through the fourth passage;
   a pressure compensator disposed at least partially within the main poppet, and fluidly connected to the second port via the first passage and to the first port via the third passage, and
   a spring coupled between the pressure compensator and the pilot poppet to provide a force proportional to a distance between the pressure compensator and the pilot poppet.

9. The valve of claim 8, wherein the first passage and the third passage include a common orifice to control the flow of the fluid in the first and the third passages.

10. The valve of claim 9, wherein the common orifice is a variable orifice adapted to regulate fluid flow rate through the first and the third passages to the control chamber in response to a pressure differential across the common orifice.

11. The valve of claim 9, wherein the common orifice includes a flow regulator to maintain a substantially constant fluid flow rate through the first passage and the third passage to the control chamber.

12. The valve of claim 8, wherein the pilot poppet includes a pilot passage fluidly communicating the control chamber with an armature chamber.

13. The valve of claim 12, wherein the pilot valve further includes a needle valve adapted to selectively open and close the pilot passage.

14. The valve of claim 8, wherein:
the second passage includes a check valve allowing fluid to flow from the control chamber only to the first port; and
the fourth passage includes a check valve allowing fluid to flow from the control chamber only to the second port.

15. The valve of claim 8, wherein the main poppet includes a frustaconical tip adapted to selectively control fluid flow between the first port and second port.

16. The valve of claim 8, wherein the second passage is disposed within the valve body.

17. The valve of claim 16, wherein the fourth passage is disposed within the valve body.

18. A hydraulic system, comprising:
a source of pressurized fluid;
a tank;
a fluid actuator having a first chamber and a second chamber;
a first valve configured to selectively fluidly communicate the first chamber with the tank; and
a second valve configured to selectively fluidly communicate the source with the first chamber, wherein at least one of the first and second valves includes:
a valve body including a main chamber having a first port and a second port;
a main poppet disposed within the main chamber and being movable between an open position and a closed position to control fluid flow between the first port and the second port, the main poppet forming a control chamber within the main chamber;
a first passage communicating the control chamber with the second port;
a second passage communicating the control chamber with the first port;
a pilot valve having a pilot poppet for controlling fluid flow between the control chamber and the first port through the second passage;
a first spring coupled between the main poppet and the pilot poppet to provide a force proportional to a distance between the main poppet and the pilot poppet;
a pressure compensator disposed at least partially within the main poppet, and fluidly connected to the second port via the first passage; and
a second spring coupled between the pressure compensator and the pilot poppet to provide a force proportional to a distance between the pressure compensator and the pilot poppet.

19. The hydraulic system of claim 18, wherein:
the second valve further includes a third passage communicating the control chamber with the first port;
the pressure compensator is fluidly connected to the first port via the third passage; and
the pilot valve further controls fluid flow between the control chamber and the second port through a fourth passage.

20. The hydraulic system of claim 19, wherein the pilot poppet includes a pilot passage fluidly communicating the control chamber with an armature chamber.

* * * * *